Sept. 22, 1970    C. W. MUELLER    3,529,715
STAMPED SIDE-FLEX CONVEYOR CHAIN
Filed May 2, 1968    2 Sheets-Sheet 2
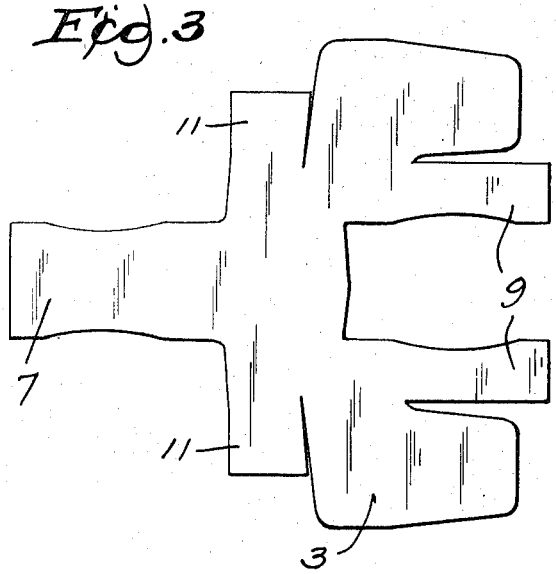
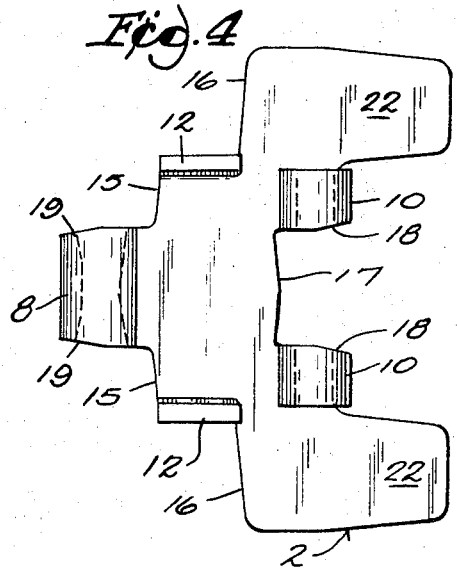
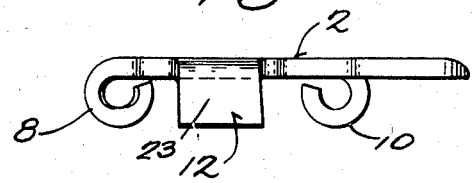
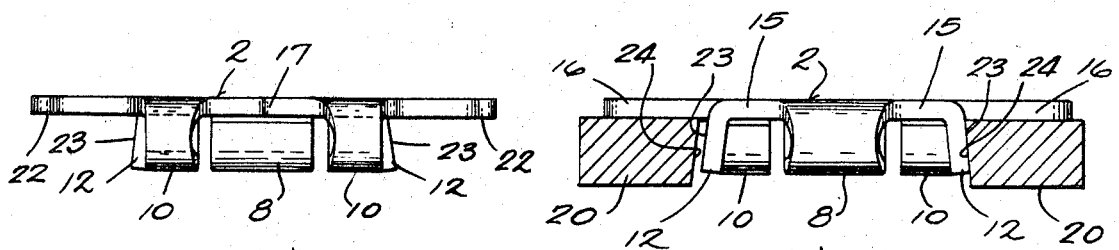

United States Patent Office 3,529,715
Patented Sept. 22, 1970

3,529,715
STAMPED SIDE-FLEX CONVEYOR CHAIN
Cláir W. Mueller, Wauwatosa, Wis., assignor to Rex Chainbelt Inc., Milwaukee, Wis., a corporation of Wisconsin
Filed May 2, 1968, Ser. No. 726,186
Int. Cl. B65g 17/06
U.S. Cl. 198—189                                5 Claims

ABSTRACT OF THE DISCLOSURE

Each link of a laterally flexible flat top conveyor chain is formed from a single sheet metal stamping. The stamping includes laterally and longitudinally extending tongues which are, respectively, bent downwardly to form chain guide members and curled downwardly to form spaced interfitting knuckles for receiving link-connecting pins.

BACKGROUND OF THE INVENTION

Field of invention

Figure 1:
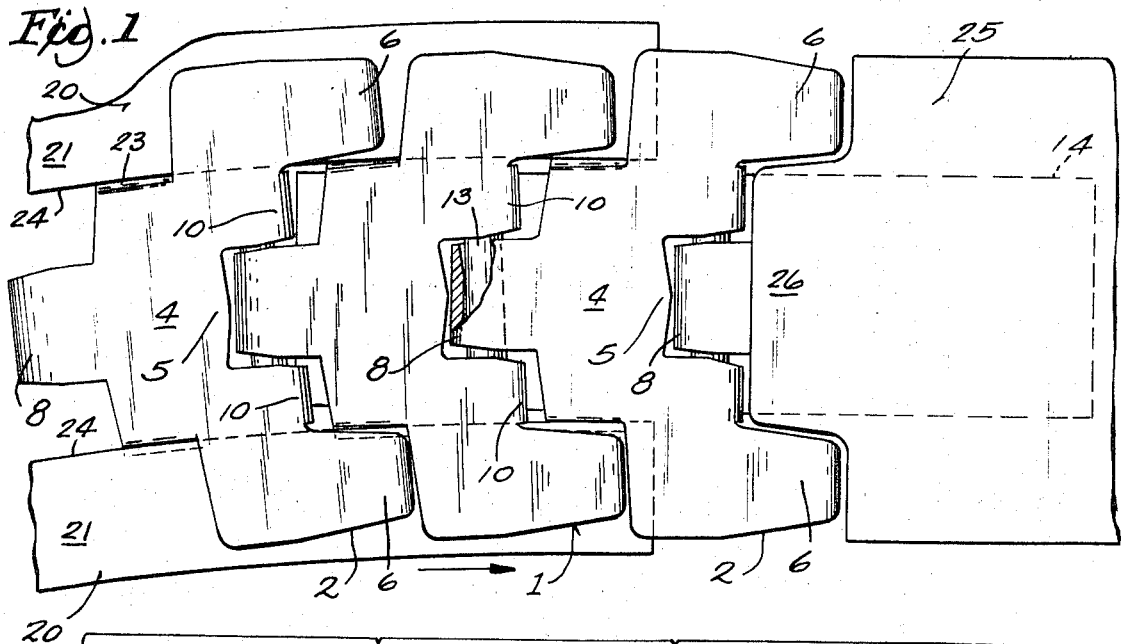
Figure 2:
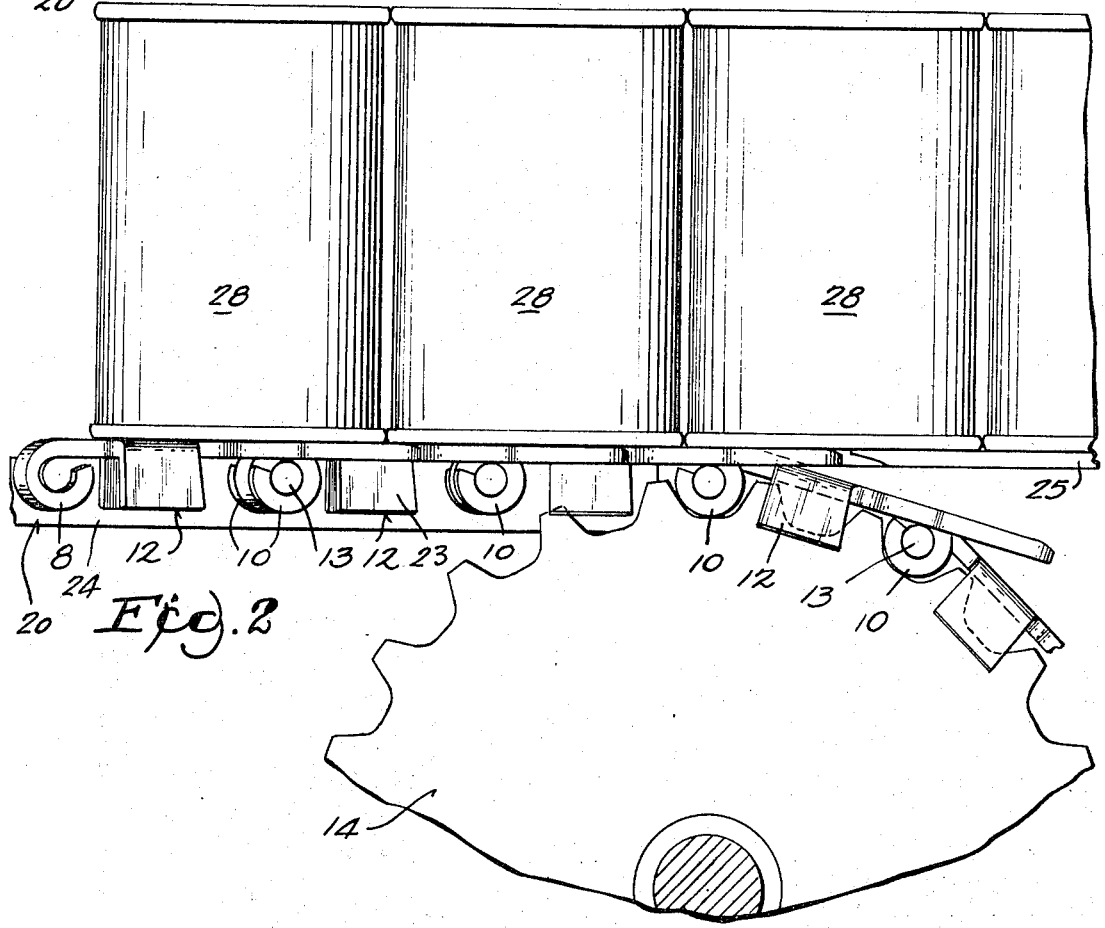

The present invention relates to article carrying chains and, specifically, to improvements in laterally flexible flat top chains the individual links of which are stamped from sheet metal and formed with interfitting knuckles. The links are interconnected by hinge pins to form an endless chain adapted to be sprocket driven and to operate upon a pair of spaced parallel stationary wear strips in either a straight or curved path.

Description of the prior art

Flat top conveyor chains having a series of interfitting pin-connected links each of which is formed from a sheet metal stamping are known in the art. The stampings have preferably been formed with generally rectangular central portions from which integral spaced tongues extend in both directions. The tongues of each stamping are curled to form spaced knuckles which interfit the knuckles of adjacent links and through which hinge pins extend to provide an endless chain of links. This type of chain is adapted to be driven by a sprocket through engagement thereby of the spaced knuckles of the interconnected links. The chain is supported and maintained in a horizontal plane of travel by a pair of parallel wear strips. The stationary wear strips are spaced apart so as to be slidably engaged by the flat undersides of the links outwardly of the curled knuckles.

It is also known in the art to provide for lateral flexibility between adjacent interconnected links so the chain may be operated in a curved path. To provide the necessary flexibility at least one interfitting curled knuckle of each link has an enlarged bore so that the hinge pin connecting said link to its adjacent link may pivot or rock within said bore. Additionally the edges of the links are provided with clearances to allow unrestrained lateral flexing with respect to adjacent links.

When operated in a curved path, laterally flexible conveyor chains are supported and guided by wear strips defining the curved path. These chains are provided with guide members which engage the wear strips to aid in guiding the chain in the curved path and to prevent frictional wear of the lateral ends of the knuckles and hinge pins.

It has been found and is shown in the prior art that where the wear strip engaging outer surfaces of the guide members and the adjacent surfaces of the wear strips are vertically disposed, the force of chain tension causes the chain when traveling in a curved path to be lifted or tilted out of engagement with the wear strips. To prevent this the engaging surfaces of the guides and wear strips are made parallel and divergent so that in engagement the wear strip slightly overlaps the guide. Thus, when the chain is operating in a curved path and chain tension causes the guide member on the inside of the curve to engage the inside wear strip, engagement of the mutually divergent surfaces will prevent the force of chain tension from lifting the chain from the wear strips.

Laterally flexible conveyor links which are formed from sheet metal stampings as described above have previously been made with guide members of two kinds. One prior art construction incorporates the guide members as lateral extensions of the curled knuckles. That construction causes undesirable stresses to be imposed on the knuckles in addition to the stresses already on said knuckles because of their primary function as link connecting means.

In the other prior art construction the guides are formed separately of the metal stamping and attached to the underside of the link as by welding. It has been necessary to so form the guides because they cannot be conveniently formed integrally with the stampings from which prior art links are made.

SUMMARY OF THE INVENTION

In the present invention the guide members are formed from and as an integral part of a sheet metal stamping from which each link is formed. Each link has a new and novel flat conveying surface configuration which makes possible the formation of guide members as lateral extensions of a portion thereof without losing the contiguity characteristic of the conveying surface provided by an assembled chain of stamped links of the prior art.

Each link, which is formed from a stamped blank, has, respectively, forwardly and rearwardly extending supporting and guide sections. Extending rearwardly from the guide section is a tongue which is curled to form a central knuckle. Extending forwardly from the supporting section are a pair of spaced tongues which are curled to form knuckles between which the central knuckle of the adjacent link will fit. A connecting pin is secured in the bores of the spaced knuckles and extends through the bore of the adjacent interfitting central knuckle.

Additionally, the guide section has extending laterally therefrom in opposite directions a pair of tongues which are bent downward to form the guide members.

The supporting section of the link formed as described is dimensioned to extend laterally over the associated wear strips to provide support for the link and to extend forwardly along each side of the guide section of the adjacent link to provide the desired surface contiguity of the assembled chain.

The links of the present invention, additionally, provide improved direct delivery of articles conveyed thereby onto a dead plate.

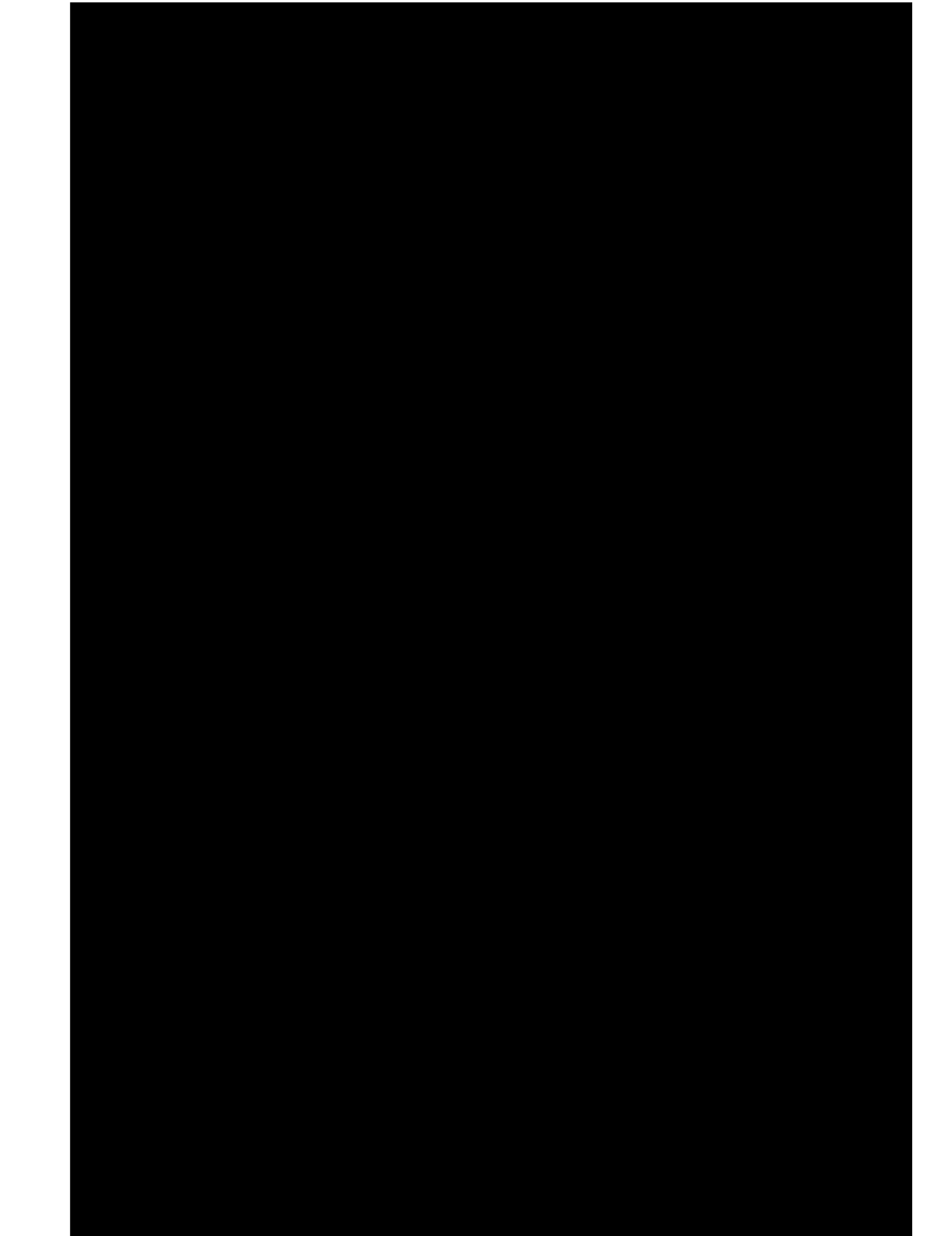

necting adjacent links for operation of the chain on laterally spaced longitudinally extending supporting wear strips, the adjacent sections of adjacent links having oppositely extending curled interfitting knuckles with aligned bores for the connecting pins, one section of each link having guides extending downwardly from each side thereof and between the wear strips to engage the adjacent sides thereof, the other section of each link extending laterally over the wear strips for the support of the link and alongside said guides of the adjacent link.

References Cited

UNITED STATES PATENTS

| 3,262,550 | 7/1966 | Kampfer | 198—189 |
| 3,363,745 | 1/1968 | Thuerman | 198—189 |

FOREIGN PATENTS

| 1,080,882 | 8/1967 | Great Britain. |

EDWARD A. SROKA, Primary Examiner